(12) United States Patent
Richman

(10) Patent No.: US 11,543,886 B2
(45) Date of Patent: Jan. 3, 2023

(54) PROVIDING TELEVISION CONTROLLER FUNCTIONS USING HEAD MOVEMENTS

(71) Applicant: Sony Corporation, Tokyo (JP)

(72) Inventor: Steven Richman, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/779,471

(22) Filed: Jan. 31, 2020

(65) Prior Publication Data
US 2021/0240276 A1 Aug. 5, 2021

(51) Int. Cl.
| | | |
|---|---|---|
| G06F 3/01 | (2006.01) | |
| G06F 3/03 | (2006.01) | |
| G06T 7/246 | (2017.01) | |
| H04N 21/482 | (2011.01) | |
| H04N 21/4223 | (2011.01) | |
| H04N 21/442 | (2011.01) | |
| G06V 40/20 | (2022.01) | |
| G06V 40/16 | (2022.01) | |

(52) U.S. Cl.
CPC .............. *G06F 3/017* (2013.01); *G06F 3/012* (2013.01); *G06F 3/0304* (2013.01); *G06T 7/248* (2017.01); *G06V 40/176* (2022.01); *G06V 40/20* (2022.01); *H04N 21/482* (2013.01)

(58) Field of Classification Search
CPC ........ G06F 3/017; G06F 3/012; G06F 3/0304; H04N 21/482; G06K 9/00335; G06K 9/00315; G06T 7/248
See application file for complete search history.

(56) References Cited

U.S. PATENT DOCUMENTS

| | | | | |
|---|---|---|---|---|
| 10,444,831 | B2 * | 10/2019 | Funes Mora | ........... G06F 3/012 |
| 2009/0153366 | A1 * | 6/2009 | Im | ............................ G06F 3/017 |
| | | | | 341/20 |
| 2016/0034044 | A1 * | 2/2016 | Basso | ...................... G06F 3/017 |
| | | | | 345/156 |
| 2016/0328604 | A1 * | 11/2016 | Bulzacki | .............. G06Q 10/063 |
| 2017/0160797 | A1 | 6/2017 | Mora | |

FOREIGN PATENT DOCUMENTS

CN        101697199        7/2012

* cited by examiner

*Primary Examiner* — Bryan Earles
(74) *Attorney, Agent, or Firm* — Trellis IP Law Group, PC

(57) ABSTRACT

Embodiments generally provide television controller functions using head movements. In some embodiments, a method includes recording a motion of a user. The method further includes determining one or more characteristics of the motion of the user. The method further includes generating a motion identifier based on the one or more characteristics. The method further includes assigning the motion identifier to a television command for controlling a television function of a television.

20 Claims, 7 Drawing Sheets

PROVIDING TELEVISION CONTROLLER FUNCTIONS USING HEAD MOVEMENTS

BACKGROUND

The issue for most accessibility features on a television is that they do not fully account for all the needs of those who have a disability. Some systems enable gesture controls for controlling a television. However, such systems involve eye tracking technology such as eye tracking infrared devices that are in close proximity and obtrusive to users. Also, such systems use predefined gestures and provide minimal customization.

SUMMARY

Embodiments generally provide television controller functions using head movements. In some embodiments, a system includes one or more processors, and includes logic encoded in one or more non-transitory computer-readable storage media for execution by the one or more processors. When executed, the logic is operable to cause the one or more processors to perform operations including: recording a motion of a user; determining one or more characteristics of the motion of the user; generating a motion identifier based on the one or more characteristics; and assigning the motion identifier to a television command for controlling a television function of a television.

With further regard to the system, in some embodiments, the motion includes a gesture, and the gesture includes a head movement. In some embodiments, the motion includes a gesture, and the gesture includes a facial movement. In some embodiments, the determining of the one or more characteristics is based on a video captured by a camera. In some embodiments, the logic when executed is further operable to cause the one or more processors to perform operations including: characterizing the motion of the user; generating characterization data for the motion; and encoding the characterization data. In some embodiments, the logic when executed is further operable to cause the one or more processors to perform operations including: providing a television command index that indexes a plurality of television commands; receiving a television command selection of a television command from the television command index; and assigning the motion identifier to the television command that was selected. In some embodiments, the logic when executed is further operable to cause the one or more processors to perform operations including: detecting a second motion from the user; recognizing the second motion; determining a second motion identifier associated the second motion based on the recognizing of the second motion; and executing a television command associated with the second motion identifier.

In some embodiments, a non-transitory computer-readable storage medium with program instructions thereon is provided. When executed by one or more processors, the instructions are operable to cause the one or more processors to perform operations including: recording a motion of a user; determining one or more characteristics of the motion of the user; generating a motion identifier based on the one or more characteristics; and assigning the motion identifier to a television command for controlling a television function of a television.

With further regard to the computer-readable storage medium, in some embodiments, the motion includes a gesture, and the gesture includes a head movement. In some embodiments, the motion includes a gesture, and the gesture includes a facial movement. In some embodiments, the determining of the one or more characteristics is based on a video captured by a camera. In some embodiments, the instructions when executed are further operable to cause the one or more processors to perform operations including: characterizing the motion of the user; generating characterization data for the motion; and encoding the characterization data. In some embodiments, the instructions when executed are further operable to cause the one or more processors to perform operations including: providing a television command index that indexes a plurality of television commands; receiving a television command selection of a television command from the television command index; and assigning the motion identifier to the television command that was selected. In some embodiments, the instructions when executed are further operable to cause the one or more processors to perform operations including: detecting a second motion from the user; recognizing the second motion; determining a second motion identifier associated the second motion based on the recognizing of the second motion; and executing a television command associated with the second motion identifier.

In some embodiments, a method includes: recording a motion of a user; determining one or more characteristics of the motion of the user; generating a motion identifier based on the one or more characteristics; and assigning the motion identifier to a television command for controlling a television function of a television.

With further regard to the method, in some embodiments, the motion includes a gesture, and the gesture includes a head movement. In some embodiments, the motion includes a gesture, and the gesture includes a facial movement. In some embodiments, the determining of the one or more characteristics is based on a video captured by a camera. In some embodiments, the method further includes: characterizing the motion of the user; generating characterization data for the motion; and encoding the characterization data. In some embodiments, the method further includes providing a television command index that indexes a plurality of television commands; receiving a television command selection of a television command from the television command index; and assigning the motion identifier to the television command that was selected.

A further understanding of the nature and the advantages of particular embodiments disclosed herein may be realized by reference of the remaining portions of the specification and the attached drawings.

DETAILED DESCRIPTION

Embodiments described herein enable, facilitate, and manage television controller functions based on head movements. Embodiments enable a television viewer to control functions of a television using movements or motions. Embodiments enable such user control with little effort by the user and without taking up much space in the room. Embodiments record, numerically encode, and assign user motions to desired television functions, which overcome many user conformity challenges such as limited range of motion. Embodiments enable such motions to be user head movements, as the head is visible from a camera normally at the height of the television.

As described in more detail herein, in various embodiments, a system records a motion of a user. The system further determines one or more characteristics of the motion of the user. The system then generates a motion identifier based on the one or more characteristics. The system then assigns the motion identifier to a television command for controlling a television function of a television.

Figure 1:
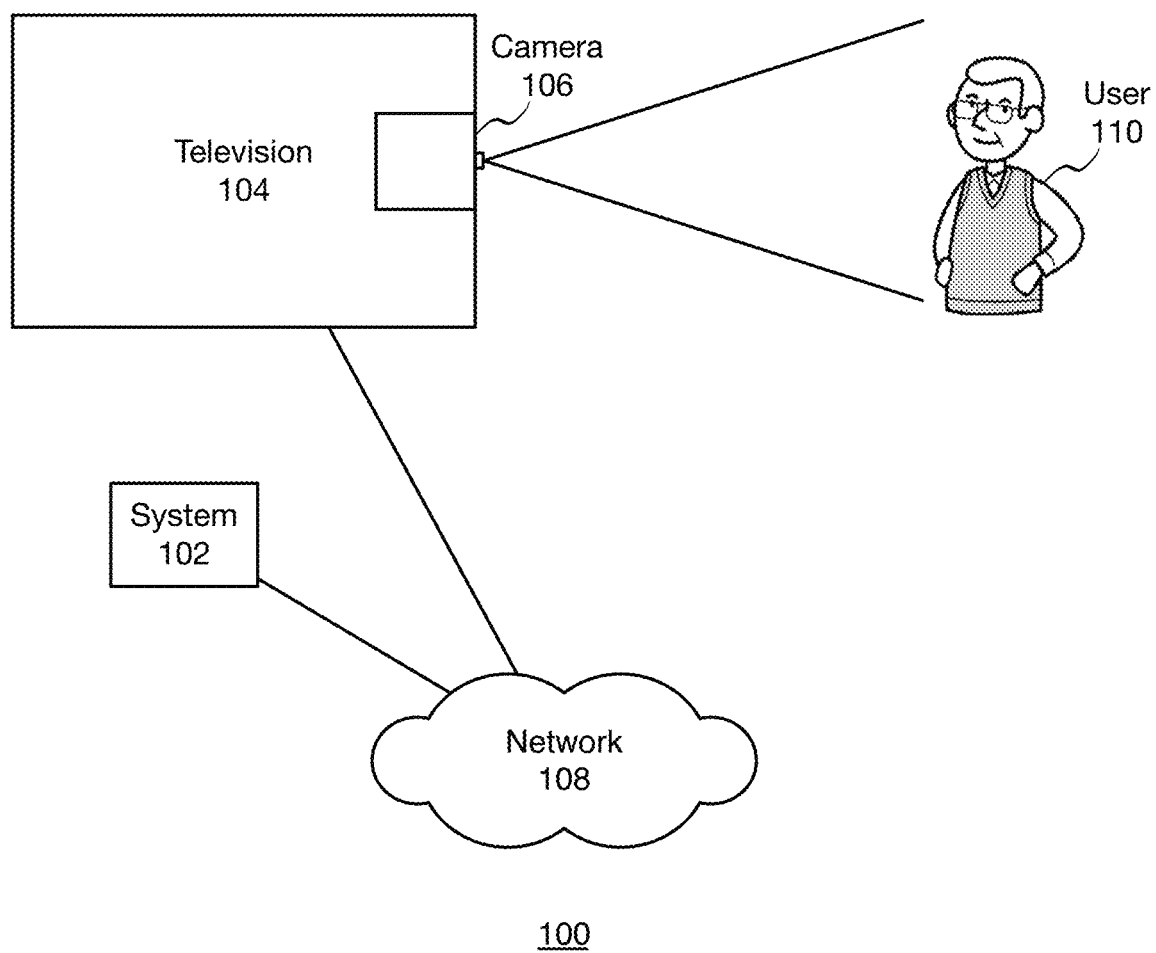
FIG. 1 is a block diagram of an example media environment, which may be used for implementations described herein.

FIG. 1 is a block diagram of an example media environment 100, which may be used for implementations described herein. In some embodiments, media environment 100 includes a system 102, which communicates with a television 104, which has a camera 106. Media environment 100 also includes a network 108 through which system 102 and television 104 communicate. Network 108 may be any suitable communication network such as a Wi-Fi network, Bluetooth network, the Internet, etc.

As described in more detail herein, camera 106 captures motions from a user 110. In various embodiments, system 102 captures motions of user 110, where system 102 uses such motions to configure television commands for controlling functions of television 104. System 102 subsequently enables user 110 to control television 110 using such motions, or gestures.

For ease of illustration, FIG. 1 shows one block for each of system 102, television 104, camera 106, and network 108. Blocks 102, 104, 106, and 108 may represent multiple systems, televisions, and cameras. Also, there may be any number of users. In other implementations, media environment 100 may not have all of the components shown and/or may have other elements including other types of elements instead of, or in addition to, those shown herein.

While a processor of system 102 performs embodiments described herein, in other embodiments, any suitable component or combination of components associated with system 102 or any suitable processor or processors associated with system 102 may facilitate performing the embodiments described herein. Furthermore, while system 102 is shown separately from television 104, in some embodiments, system 102 may be integrated with television 104. Furthermore, while camera 106 is shown integrated with television 104, in some embodiments, camera 106 may be separate from television 104. For example, in some embodiments, camera 106 may be a stand-alone camera that sits on a surface or other support. In the various implementations described herein, a processor of system 102 causes the elements described herein (e.g., information, etc.) to be displayed in a user interface on one or more display screens.

Figure 2:
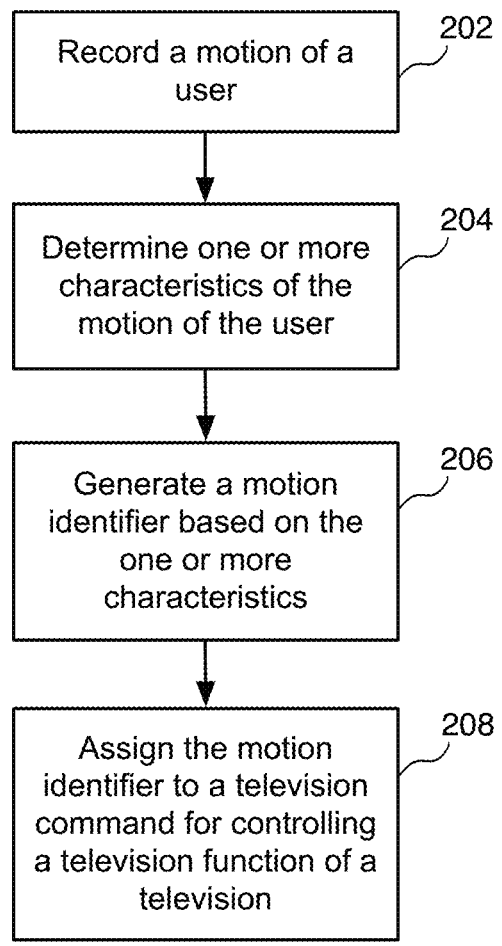
FIG. 2 is an example flow diagram for providing television controller functions using head movements, according to some implementations.

FIG. 2 is an example flow diagram for providing television controller functions using head movements, according to some implementations. Referring to both FIGS. 1 and 2, a method is initiated at block 202, where a system such as system 102 records a motion of a user. The system may utilize one or more video cameras to captured the motion. In various embodiments, the motion includes a gesture. In various embodiments, the gesture includes a head movement. In various embodiments, the gesture includes a facial movement. In some embodiments, the facial movement is associated with eyes.

While some embodiments are described herein in the context of user head motions, these embodiments may apply to other gestures. A head motion is a dependable way of using gestures to control a television. This is because the viewer/user need not hold or position a device close to his or her face as with conventional eye tracking devices. Embodiments described herein are not overtly disruptive to watching television, especially with other viewers in the room, where arm and hand movements can be distracting. Embodiments enable customized movements that are familiar with the user or comfortable to make. The system may cause any body movement or motion to be captured by a television mounted camera or a phone camera positioned away from the user.

In various embodiments, the system may record user motions or gestures in response to the user holding down a remote control key, and then selecting a button (e.g., "Head Motion Capture," etc.) from a menu selection of options. In some embodiments, the system may start and end such a custom motion capture process when the user presses particular buttons (e.g., pressing the up arrow key to start, pressing the down arrow key to stop, etc.). The keys used to capture head motion can vary, depending on the particular implementation. The head motion may be any motion that is discrete enough to capture based on the camera's sensor quality. In some embodiments, the system may cause the television to emit a success indicator light (e.g., a green light) upon capturing the movement in order to confirm its pattern matching.

At block 204, the system determines one or more characteristics of the motion of the user. In various embodiments, the system determines the one or more characteristics based on a video captured by a camera. In various embodiments, the system determines the characteristics of the motion of the user, generates characterization data, and then encodes the characterization data. As described in more detail below, the system may use various recognition techniques to determine characteristics of the motion of the user. Example embodiments directed to the determination of motion characteristics of the user are described in more detail below.

At block 206, the system generates a motion identifier based on the one or more characteristics. In various embodiments, the system generates the motion identifier based on the encoding of the characterization data, which is based on the one or more characteristics. In some embodiments, the motion identifier may be referred to as an event identifier. Example embodiments directed to the generation of motion identifiers based on motion characteristics are described in more detail below.

At block 208, the system assigns the motion identifier to a television command for controlling a television function of a television. Example embodiments directed to the assignment of the motion identifier to a television command are described in more detail below.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 3:
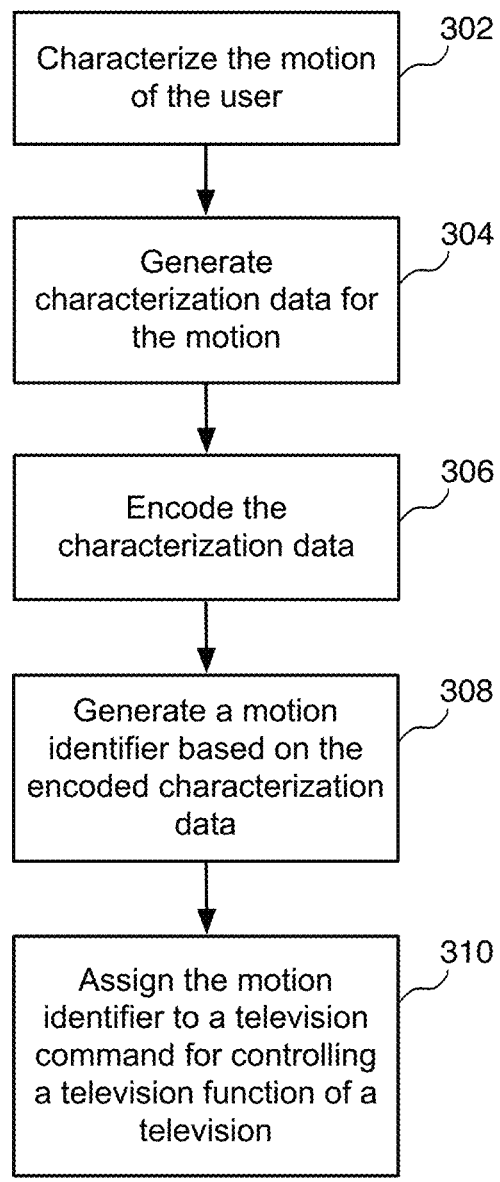
FIG. 3 is an example flow diagram for configuring television controller functions, according to some implementations.

FIG. 3 is an example flow diagram for configuring television controller functions, according to some implementations. Referring to both FIGS. 1 and 3, a method is initiated at block 302, where a system such as system 102 characterizes the motion of the user. In various embodiments, the system may use various recognition techniques to determine characteristics of the motion of the user. For example, in some embodiments, a motion may include a gesture, where the gesture is a horizontal head movement. In some embodiments, a motion may include a gesture, where the gesture is a vertical head movement. In some embodiments, the system may also use facial recognition techniques to characterize facial movements including eye movements to include as user motions.

In various embodiments, the system performs video analysis of the user's motion (e.g., the user's captured head movement). The system may reference the face and neck and upper shoulders visible on camera, and generate a digital matrix or grid of pixel-based macro blocks. The system may then assign initial locational values from the uncompressed video frames (e.g., key frame or I-frame, etc.). Locational data may be made up of 2D location parameters or 3D polygons values. The system may monitor these initial location values frame-by-frame over time for change and direction. The system performs macroblock-by-macroblock analysis of each object and/or analysis of similar moving macroblocks. The system compares changes in macroblocks to static macroblocks to differentiate head movements and movable objects. In some embodiments, the system may apply motion vectors to changing macroblocks, and identify these changing macroblocks in more detail as objects to be tracked for length and velocity (e.g., such as with facial features such as eyes, nose, ears, chin, forehead, etc.). In some embodiments, the system may use velocity and positional mapping to generate a pixel map over time. In some embodiments, the system may recognize 2D single camera applications and 3D depth cues patterns as discrete motions, macroblock by macroblock. The system may then code discrete motion sub-values as referential digital signature values. In various embodiments, the system generates a unique digital signature or fingerprint from these collective head movements. The system compares the digital signature for each face/head sub-movement to stored gesture values.

In various embodiments, each head movement code value for each custom head movement may represent any television controller function by assigning that particular head movement to that radio frequency (RF) key code on the controller or virtual television command. Head gestures may require a higher level of precision to implement than hand movements. As such, the system may utilize 4K+ video cameras with high dynamic range (HDR), high ISO values, complementary metal-oxide-semiconductor (CMOS), and full frame sensors to generate higher-level precision, particularly in low light. By using two 4K HDR cameras with large full frame CMOS sensors that have a large range of ISO values (e.g., 100 up to 250,000, etc.), the system may capture head gestures in bright light as well as very low light (e.g., one candela) with accuracy. The system may also combine these techniques with facial recognition techniques that quantize individual elements of the face and head.

As indicated herein, the level of accuracy required to capture head movements may be dependent on the quality of the camera sensor and lens placed on the television or as part of the television. Full frame CMOS censors are expensive, and the focal length of the lens determines the ability of the camera to optically zoom to capture slight head movements. That combined with the resolution being 4K (8 Megapixel) or higher is a determining factor such that the system precisely isolates and encodes the head movements. The system may utilize high-dynamic range cameras with a wide range of ISO values to account for bright light and low light conditions. This is helpful when a user might have the ambient lights low for a movie and still be able to use the head movement mode to control the television.

In dark rooms for movie watching, high ISO sensors can still pick up head movement with ISO values of 100,000 or more. In various embodiments, the system may use a frame-by-frame pixel-based techniques to track changes in movement (e.g., inter-frame encoding). The system may also use object-based recognition techniques that apply motion vectors to depict position, direction, and speed, depending on the level of accuracy needed. Each of these techniques enables digitization of the head movements and is valid for tracking and isolating video objects that change over time.

Referring still to FIG. 3, at block 304, the system generates characterization data for the motion. In some embodiments, such characterization data may include metadata that describes different motions, including facial expressions.

At block 306, the system encodes the characterization data. In various embodiments, the characterization data may include digital fingerprints generated by the system. The system may generate numerical codes based on techniques involving an object-oriented vectoring process (e.g., position and velocity vectors assigned to facial objects) for head movement. The system may also generate numerical codes based on techniques involving a video frame capture and pixel mapping system, where changes in successive frames and pixel groupings (e.g., macro blocks) are marked and recorded using inter-frame coding analysis techniques. These collective set of motion values (from either vector object motion analysis or video frame and pixel-based progression) form a digital signature that is unique to each head movement. This combined set of encoded values may collectively represent a single gesture or fingerprint, which is then assignable to a key press event and/or television command.

At block 308, the system generates a motion identifier based on the encoded characterization data. In various embodiments, the system translates television remote control button presses into software commands in the television. These software commands represent remapped functions that are remapped to a motion identifier.

In various embodiments, the motion identifier corresponds to a particular user motion (e.g., a user head movement, etc.). In various embodiments, the system maps the motion identifier to a television function and/or to a code value of a remote control device.

The system may capture motions or gestures in detail, including depth cues, by using one or two cameras with 4K complementary metal-oxide-semiconductor (CMOS) sensors. In some embodiments, the system may quantize any needed movements or gestures. The system may achieve this using one camera for 2D recording, using two cameras spaced apart for 3D recording, using three cameras for high dynamic range (HDR), etc. Using three lenses or cameras enables for an HDR version of the movement to be captured instantly, rather than sequentially. In some embodiments, for object and/or facial recognition, the system may increase the number of locational values on the face and head in order to provide greater precision of movement to be captured. In some embodiments, if the system recognizes that an initial capture fails, the system may expand the facial objects periphery values that outline the objects. The system may then assign values that represent an object or facial signature.

At block 310, the system assigns the motion identifier to a television command for controlling a television function of a television. For example, the system may assign slight head movements such as nodding the head to change channels. In another example, tilting the head to the right may represent a right arrow key, or tilting the head to the left may represent a left arrow key. In some embodiments, the system may assign a fingerprint described above to a motion ID. This motion ID becomes the basis for referring internally to this gesture universally to activate television commands.

In various embodiments, the system assigns captured and algorithmic coded user motions (e.g., head movements, etc.) to represent television remote control buttons presses or selections and associated commands. Such coded user motions may also represent virtual television menu control functions. This tagging or mapping process of replacing a key press with a head movement to control a television may be achieved by the system assigning a motion identifier to the motion or event to a particular remote control command. The motion identifier may also be referred to as an event ID. When the television is in a gesture mode, the system recognizes the motion (e.g., head movement, etc.) and subsequently executes one or more corresponding television commands. In some embodiments, the system may assign or map motion identifiers to television functions in the background when the television is turned on or in standby mode.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 4:
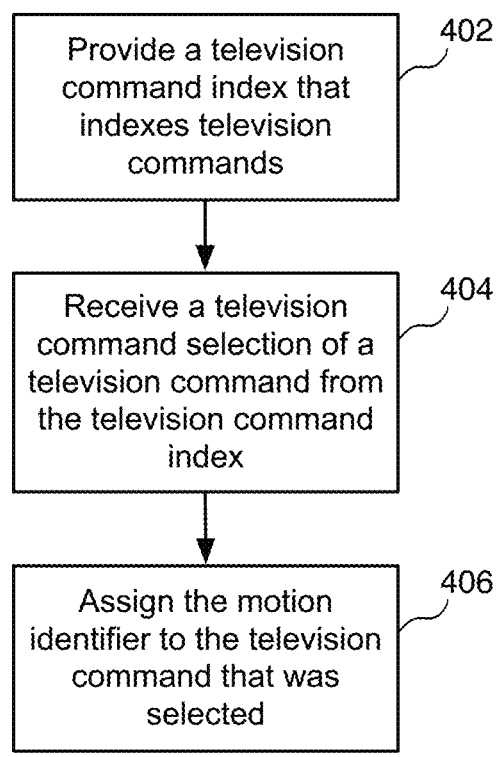
FIG. 4 is an example flow diagram for enabling a user to configure television controller functions, according to some implementations.

FIG. 4 is an example flow diagram for enabling a user to configure television controller functions, according to some implementations. Referring to both FIGS. 1 and 4, a method is initiated at block 402, where a system such as system 102 provides a television command index that indexes television commands. In various embodiments, the television command index includes television remote control commands and/or virtual television functions. In various embodiments, the system may store and manage the television command index locally from an internal database and/or a cloud server.

At block 404, the system receives a television command selection of a television command from the television command index.

At block 406, the system assigns the motion identifier to the television command that was selected. The system enables a single key press to reassign a new command or virtual television function to a given user motion.

In various embodiments, the re-mapping of television functions to motions of the user (separate from button presses of a remote control device) also enables motions such as head movements to represent concatenated television commands or parallel television functions executed simultaneously. As such, a simple head nod down may represent a channel change down one level, and/or a combined channel change down one level plus a volume reset to lower volume, and/or other series of commands. Accordingly, a head movement not only replaces one remote control key press, but may also be used to run a series of user-programmed commands in parallel. Virtual television menu functions may thus be used to execute a series of complex commands.

In various embodiments, the system enables the user to add embedded virtual television functions that are not currently represented on conventional physical remote control devices. In some embodiments, the system may achieve this through a button reassignment application resident in the television. Button reassignment may occur from an indexing all of the available television commands. The system may make the indexing visible and selectable by a user. For example, the system may enable the user to hold down a remote control button (e.g., for a predetermined length of time). The system may then enable the user to select a replacement television command from a menu of options. The system then assigns the motion (e.g., motion identifier) to a particular television command, which may subsequently executed using a user motion or gesture or alternatively button press on the remote control device. As indicated herein, the system may also concatenate a series of television commands. In various embodiments, the system may assign a user motion to a television function key code associated with a remote control device button.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

The following embodiments are directed to the system enabling a user to control television functions using user motions after motion identifiers are assigned to television commands and while the user is watching television.

Figure 5:
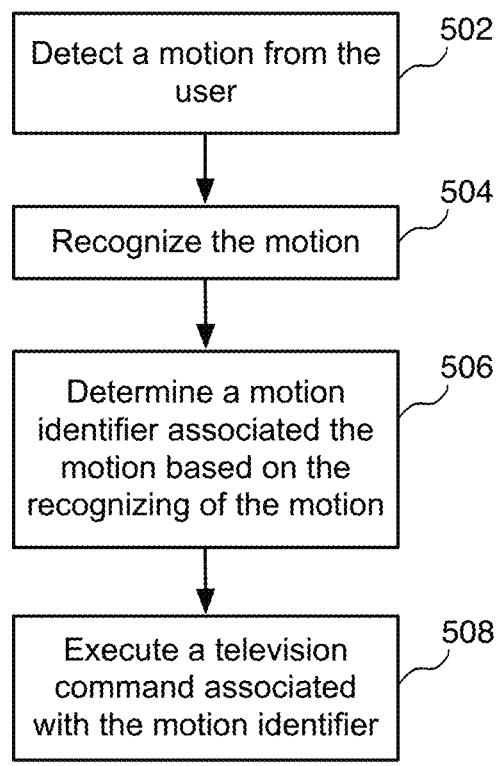
FIG. 5 is an example flow diagram for enabling a user to control television controller functions using gestures, according to some implementations.

FIG. 5 is an example flow diagram for enabling a user to control television controller functions using gestures, according to some implementations. As described in more detail herein, when the system and/or television are in a gesture mode, the television reads a real-time motion of the user, captures that instance, and compares the motion to those in a database of movements or database of referenced motion fingerprints. This triggers the corresponding television commands or events. Referring to both FIGS. 1 and 5, a method is initiated at block 502, where a system such as system 102 detects a motion from the user. In various embodiments, when the system is in a gesture mode, the user's motions (e.g., head movements) are captured from live camera video on the television or smart phone or smart remote, etc.

At block 504, the system recognizes the motion. As indicated above, in various embodiments, the system determines a motion classification of the motion based on the recognizing of the motion. The system may use various recognition techniques to determine characteristics of the motion of the user.

At block 506, the system determines a motion identifier associated the motion based on the recognizing of the motion. In various embodiments, the system matches the motion classification to a motion identifier. The system compares the motion identifier to those in a database of stored motion identifiers. In some embodiments, these motion identifiers may be stored as metadata (e.g., digital signatures of encoded values, etc.). The system may identify associated remote control key or associated television functions based on the motion identifiers. In some embodiments, the live comparison may be used to reduce the head movements numerically to a matching head function, thus requiring less processing than the original head capture.

At block 508, the system executes a television command associated with the motion identifier. In various embodiments, the system sends the motion identifier to the television, where the television executes one or more television functions based on the command. Such commands may execute remote control commands and/or virtual television functions.

In some embodiments, when the system or television is in a gesture mode, the system may activate a particular remote control button command by using the user's previously recorded, custom head movement instead of a key button press. In various scenarios, the remapping or reassignment of a key press to a motion needs to be a single command. As indicated herein, a motion may correspond to and execute a series of multiple, concatenated television commands that represent a single event that is then coded as a programmed television function (series of repeatable steps or parallel steps). The initial head motion capture can be stored as a standard video file or a motion JPEG. A viewer can assign the recorded head movement ID (video file with motion metadata codes tagged to it that identify it as unique and which are used as its "fingerprint") to represent any television function and reassign that head movement ID to a single remote control button or virtual menu control function.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Embodiments described herein provide various benefits. For example, embodiments use user motions such as head movements to represent television controller functions. Embodiments also enable a user to use motions such as head movements to control television functions.

Figure 6:
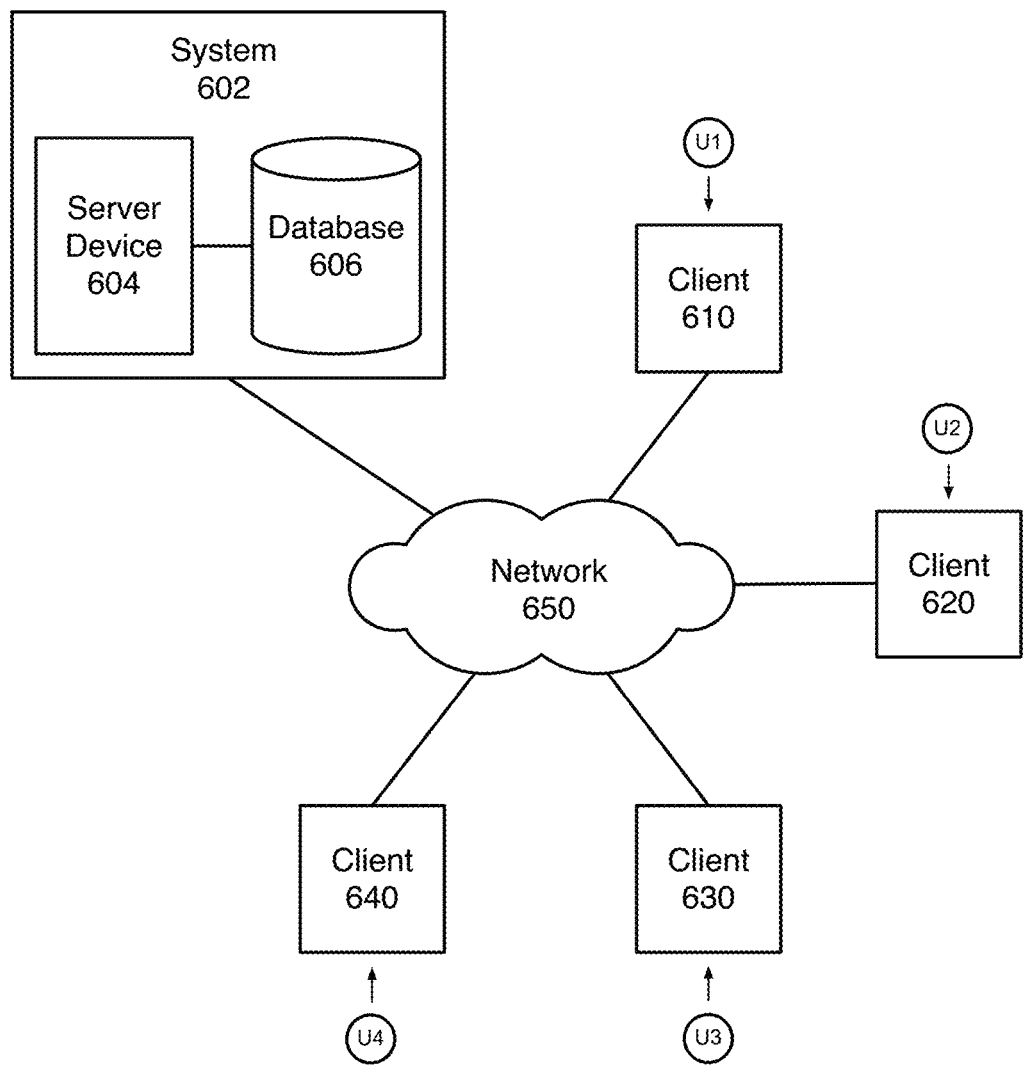
FIG. 6 is a block diagram of an example network environment, which may be used for some implementations described herein.

FIG. 6 is a block diagram of an example network environment 600, which may be used for implementations described herein. In some implementations, network environment 600 includes a system 602, which includes a server device 604 and a database 606. In various embodiments, system 602 may be used to implement system 102 of FIG. 1, as well as to perform implementations described herein. Network environment 600 also includes client devices 610, 620, 630, and 640, which may communicate with system 602 and/or may communicate with each other directly or via system 602. Network environment 600 also includes a network 650 through which system 602 and client devices 610, 620, 630, and 640 communicate. Network 650 may be any suitable communication network such as a Wi-Fi network, Bluetooth network, the Internet, etc.

For ease of illustration, FIG. 6 shows one block for each of system 602, server device 604, and network database 606, and shows four blocks for client devices 610, 620, 630, and 640. Blocks 602, 604, and 606 may represent multiple systems, server devices, and databases. Also, there may be any number of client devices. In other implementations, network environment 600 may not have all of the components shown and/or may have other elements including other types of elements instead of, or in addition to, those shown herein.

While server 604 of system 602 performs embodiments described herein, in other embodiments, any suitable component or combination of components associated with server 602 or any suitable processor or processors associated with server 602 may facilitate performing the embodiments described herein.

In the various implementations described herein, a processor of system 602 and/or a processor of any client device 610, 620, 630, and 640 causes the elements described herein (e.g., information, etc.) to be displayed in a user interface on one or more display screens.

Figure 7:
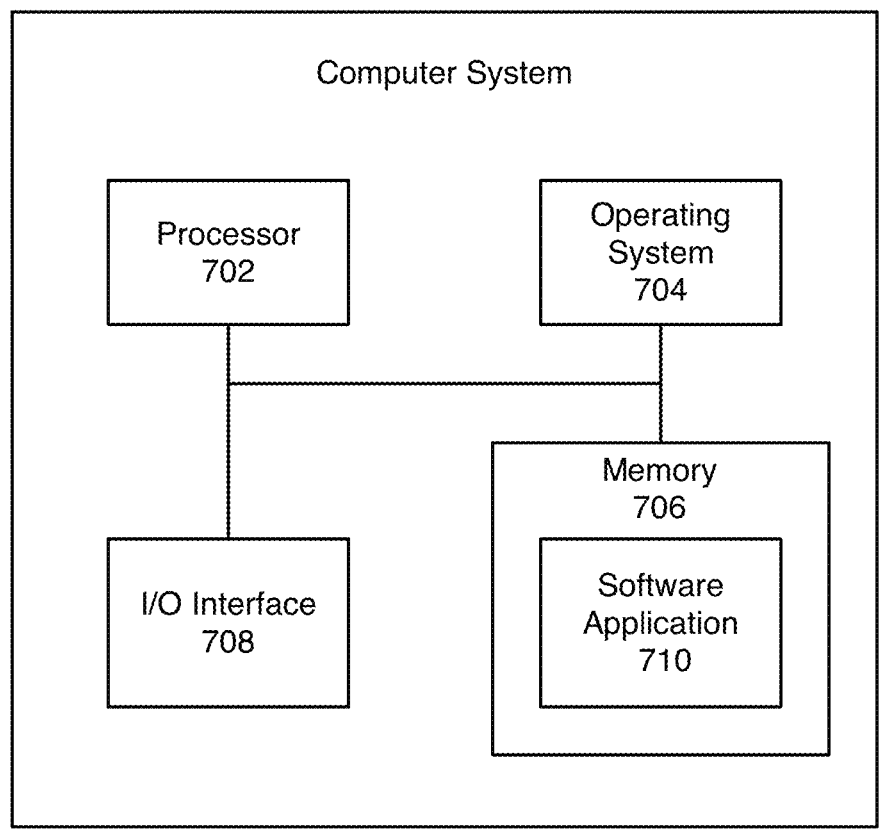
FIG. 7 is a block diagram of an example computer system, which may be used for some implementations described herein.

FIG. 7 is a block diagram of an example computer system 700, which may be used for some implementations described herein. For example, computer system 700 may be used to implement server device 604 of FIG. 6 and/or system 102 of FIG. 1, as well as to perform implementations described herein. In some implementations, computer system 700 may include a processor 702, an operating system 704, a memory 706, and an input/output (I/O) interface 708. In various implementations, processor 702 may be used to implement various functions and features described herein, as well as to perform the method implementations described herein. While processor 702 is described as performing implementations described herein, any suitable component or combination of components of computer system 700 or any suitable processor or processors associated with computer system 700 or any suitable system may perform the steps described. Implementations described herein may be carried out on a user device, on a server, or a combination of both.

Computer system 700 also includes a software application 710, which may be stored on memory 706 or on any other suitable storage location or computer-readable medium. Software application 710 provides instructions that enable processor 702 to perform the implementations described herein and other functions. Software application may also include an engine such as a network engine for performing various functions associated with one or more networks and network communications. The components of computer system 700 may be implemented by one or more processors or any combination of hardware devices, as well as any combination of hardware, software, firmware, etc.

For ease of illustration, FIG. 7 shows one block for each of processor 702, operating system 704, memory 706, I/O interface 708, and software application 710. These blocks 702, 704, 706, 708, and 710 may represent multiple processors, operating systems, memories, I/O interfaces, and software applications. In various implementations, computer system 700 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
    one or more processors; and
    logic encoded in one or more non-transitory computer-readable storage media for execution by the one or more processors and when executed operable to cause the one or more processors to perform operations comprising:
    recording a motion of a user, wherein the motion comprises a gesture, and wherein the gesture comprises one or more of a right tilt head movement and a left tilt head movement;
    determining one or more characteristics of the motion of the user;
    generating characterization data for the motion of the user based on the one or more characteristics of the motion of the user, wherein the characterization data comprises metadata that describes the motion of the user;
    encoding the characterization data, wherein the encoding of the characterization data results in encoded characterization data, and wherein the encoded characterization data comprises a set of encoded motion values that collectively represent the gesture;
    generating a motion identifier based on the encoded characterization data; and
    assigning the motion identifier to a plurality of television commands for controlling a plurality of television functions of a television.

2. The system of claim 1, wherein the right tilt head movement represents a first television command, and wherein the left tilt head movement represents a second television command.

3. The system of claim 1, wherein the logic when executed is further operable to cause the one or more processors to perform operations comprising:
    concatenating the plurality of television commands into a series of television commands; and
    executing the series of television commands in response each subsequent instances of the gesture.

4. The system of claim 1, wherein the determining of the one or more characteristics is based on a video captured by a camera.

5. The system of claim 1, wherein the logic when executed is further operable to cause the one or more processors to perform operations comprising:
    characterizing the motion of the user;

generating characterization data for the motion; and
encoding the characterization data.

6. The system of claim 1, wherein the logic when executed is further operable to cause the one or more processors to perform operations comprising:
providing a television command index that indexes a plurality of television commands;
receiving a television command selection of a television command from the television command index; and
assigning the motion identifier to the television command that was selected.

7. The system of claim 1, wherein the logic when executed is further operable to cause the one or more processors to perform operations comprising:
detecting a second motion from the user;
recognizing the second motion;
determining a second motion identifier associated the second motion based on the recognizing of the second motion; and
executing a television command associated with the second motion identifier.

8. A non-transitory computer-readable storage medium with program instructions stored thereon, the program instructions when executed by one or more processors are operable to cause the one or more processors to perform operations comprising:
recording a motion of a user, wherein the motion comprises a gesture, and wherein the gesture comprises one or more of a right tilt head movement and a left tilt head movement;
determining one or more characteristics of the motion of the user;
generating characterization data for the motion of the user based on the one or more characteristics of the motion of the user, wherein the characterization data comprises metadata that describes the motion of the user;
encoding the characterization data, wherein the encoding of the characterization data results in encoded characterization data, and wherein the encoded characterization data comprises a set of encoded motion values that collectively represent the gesture;
generating a motion identifier based on the encoded characterization data; and
assigning the motion identifier to a plurality of television commands for controlling a plurality of television functions of a television.

9. The computer-readable storage medium of claim 8, wherein the right tilt head movement represents a first television command, and wherein the left tilt head movement represents a second television command.

10. The computer-readable storage medium of claim 8, wherein the gesture comprises a facial movement.

11. The computer-readable storage medium of claim 8, wherein the determining of the one or more characteristics is based on a video captured by a camera.

12. The computer-readable storage medium of claim 8, wherein the instructions when executed are further operable to cause the one or more processors to perform operations comprising:
characterizing the motion of the user;
generating characterization data for the motion; and
encoding the characterization data.

13. The computer-readable storage medium of claim 8, wherein the instructions when executed are further operable to cause the one or more processors to perform operations comprising:
providing a television command index that indexes a plurality of television commands;
receiving a television command selection of a television command from the television command index; and
assigning the motion identifier to the television command that was selected.

14. The computer-readable storage medium of claim 8, wherein the instructions when executed are further operable to cause the one or more processors to perform operations comprising:
detecting a second motion from the user;
recognizing the second motion;
determining a second motion identifier associated the second motion based on the recognizing of the second motion; and
executing a television command associated with the second motion identifier.

15. A computer-implemented method comprising:
recording a motion of a user, wherein the motion comprises a gesture, and wherein the gesture comprises one or more of a right tilt head movement and a left tilt head movement;
determining one or more characteristics of the motion of the user;
generating characterization data for the motion of the user based on the one or more characteristics of the motion of the user, wherein the characterization data comprises metadata that describes the motion of the user;
encoding the characterization data, wherein the encoding of the characterization data results in encoded characterization data, and wherein the encoded characterization data comprises a set of encoded motion values that collectively represent the gesture;
generating a motion identifier based on the encoded characterization data; and
assigning the motion identifier to a plurality of television commands for controlling a plurality of television functions of a television.

16. The method of claim 15, wherein the right tilt head movement represents a first television command, and wherein the left tilt head movement represents a second television command.

17. The method of claim 15, wherein the gesture comprises a facial movement.

18. The method of claim 15, wherein the determining of the one or more characteristics is based on a video captured by a camera.

19. The method of claim 15, further comprising:
characterizing the motion of the user;
generating characterization data for the motion; and
encoding the characterization data.

20. The method of claim 15, further comprising:
providing a television command index that indexes a plurality of television commands;
receiving a television command selection of a television command from the television command index; and
assigning the motion identifier to the television command that was selected.

* * * * *